Nov. 22, 1949 R. J. SWANFELT 2,488,691
CONDENSER TESTER
Filed May 11, 1948
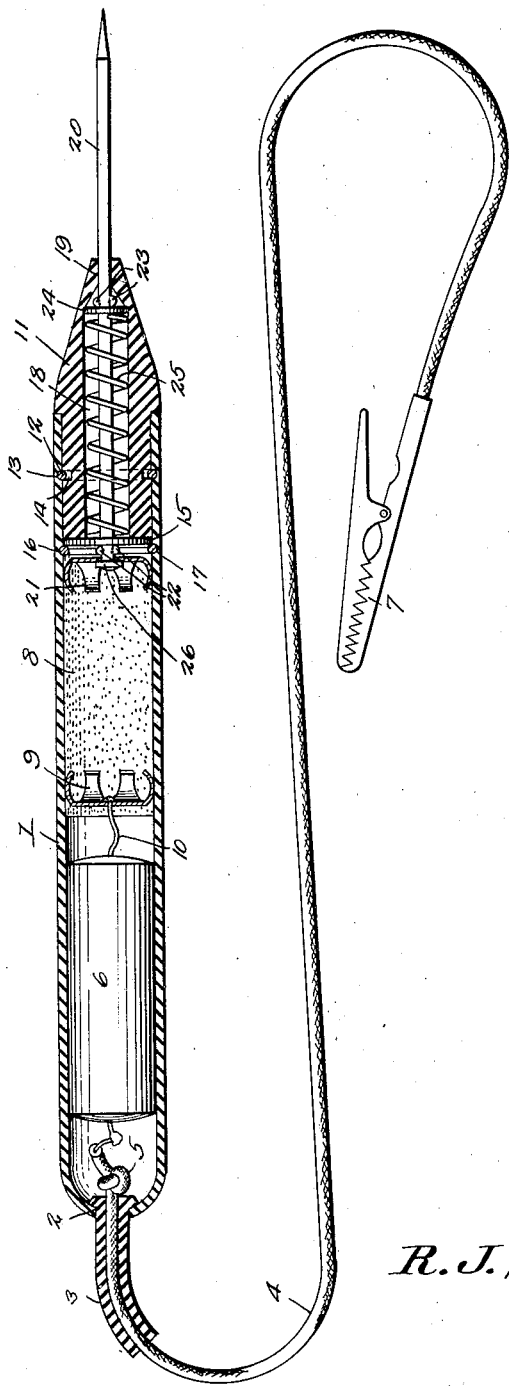
R. J. Swanfelt
INVENTOR
BY C. A. Snow & Co.
ATTORNEYS.

Patented Nov. 22, 1949

2,488,691

UNITED STATES PATENT OFFICE 2,488,691

CONDENSER TESTER

Russell J. Swanfelt, Fort Wayne, Ind.

Application May 11, 1948, Serial No. 26,398

1 Claim. (Cl. 175—183)

This invention relates to improvements in condenser testers.

An object of the invention is to provide an improved condenser tester for use in locating open or intermittent condensers in radio or electronic circuits while said circuits are functioning or operating.

Another object of the invention is to provide an improved condenser tester including a test condenser in series with a variable resistance normally at its high value, and a slidable test tip or prod connected with said variable resistance for gradually reducing the value of the resistance to zero ohms when the test tip or prod is in fully retracted position.

A further object of the invention is to provide an improved condenser tester which provides for the slow charging of the test condenser as the associated variable resistance is decreased by pressure upon and longitudinal movement of the test tip or prod, thus preventing a sudden voltage surge when the tester is being operated.

A still further object of the invention is to provide an improved condenser tester which will be highly efficient in use, and relatively inexpensive to manufacture and produce.

Other objects will appear as the description proceeds.

In the accompanying drawings which form a part of this application:

The single figure is a longitudinal sectional view through the improved condenser tester.

Like characters of reference are used throughout the following specification and the accompanying drawing to designate corresponding parts.

In carrying out the invention there is shown and provided an improved condenser tester including an elongated tubular body 1, preferably formed of insulating material, the same being closed at one end except for an axial opening 2 therethrough.

A rubber sleeve or grommet 3 is disposed through the axial opening 2, and an insulated conductor wire 4 extends through the sleeve or grommet 3, the inner end within the body 1 being knotted as at 5 and electrically connected with a test condenser 6 of .01–.1 mfd. capacity disposed within the inner end of said body 1. A test clip 7 is electrically connected with the outer or free end of the conductor wire 4.

A resistance coating 8 of graphite is provided upon a portion of the inner wall of the body 1, and a fixed resistance contact 9 is in electrical contact with the inner end of said coating, said contact 9 being electrically connected by the conductor 10 with the adjacent end of the proper test condenser 6.

An insulated probe end 11 is secured in the open end of the body 1 by means of the split locking spring 12 which seats in the annular locking grooves 13 and 14 formed respectively in the inner wall of the body 1 and about the inner end of the probe end 11.

A stop washer 15 is supported next to the inner end of the probe end 11 by means of the split locking spring 16 receivable in the annular groove 17 formed in the inner wall of the body 1.

The probe end 11 is formed with an enlarged axial bore 18 and a reduced axial bore 19 through its forward or front end.

The metal sliding probe tip or prod 20 is longitudinally slidable inwardly through the probe end 11, and supports the sliding contact 21 on its inner end for electrical contact with the resistance coating 8 in the body 1.

Laterally extending stop or limiting ears 22 and 23 are formed on the slidable tip or prod 20 in spaced relation serving to limit the movement of said tip or prod 20. A washer 24 is disposed about the tip or prod 20 adjacent the stop ears 23, and a coil return spring 25 is positioned within the enlarged axial bore 18 about the tip or prod 20 for normally and resiliently urging the tip or prod 20 and its slidable contact 21 to their outermost position. A washer 26 is also secured to the inner end of the tip or prod 20 for securing the contact 21 in place.

In operation, the clip 7 is clipped on one end contact (not shown) of the condenser to be tested, and the outer end of the tip or prod 20 is forced into engagement with the contact at the other end of the condenser being tested, and pressure is applied upon the body 1, thereby forcing the slidable contact inwardly along the resistance coating 8, thus allowing the test condenser to slowly charge without producing a sudden voltage surge, as would be the case were a test condenser placed directly across the condenser being tested without the use of a series variable resistance.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

A condenser tester comprising a hollow body, a test condenser mounted within one end of the body, a conductor wire electrically connected with the test condenser, a resistance coating on the inner surface of the body, a stationary contact member secured within the body in contact with the resistance coated body wall, a wire providing a circuit between the contact member and test condenser, a hollow probe member fitted in the opposite end of the hollow body, a slidable contact tip movable longitudinally through the probe member, a washer secured to the contact tip within the hollow probe member, a circular contact member secured on the inner end of the slidable contact tip, a spring coiled around the contact tip engaging the washer and circular contact member, normally urging the contact tip outwardly, said circular contact member including a circular line of contact fingers formed on the periphery of the circular contact member, said fingers contacting the resistance coating as the contact fingers move through the body and the contact tip is pressed against the test condenser under test with gradually increasing pressure, and said spring adapted to return the contact tip to its normal extended position when the pressure on the said contact tip is relieved.

RUSSELL J. SWANFELT.

REFERENCES CITED

The following references are of record in the file of this patent:

UNITED STATES PATENTS

| Number | Name | Date |
| --- | --- | --- |
| 1,501,339 | Hipple | July 15, 1924 |
| 1,539,266 | Mountford | May 26, 1925 |
| 1,986,414 | Saunders | Jan. 1, 1935 |
| 2,216,559 | Ortlieb et al. | Oct. 1, 1940 |